May 21, 1940.　　H. C. BOSTWICK　　2,201,468
COLLAPSIBLE DRUM
Filed Sept. 10, 1937
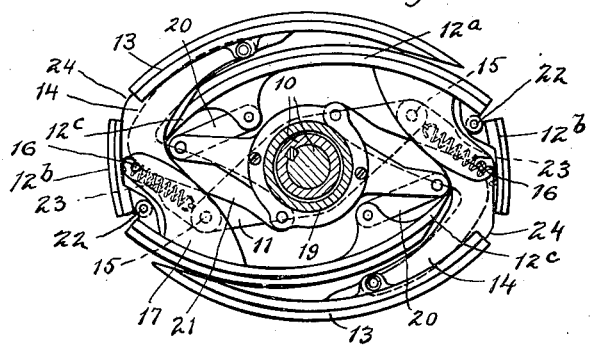
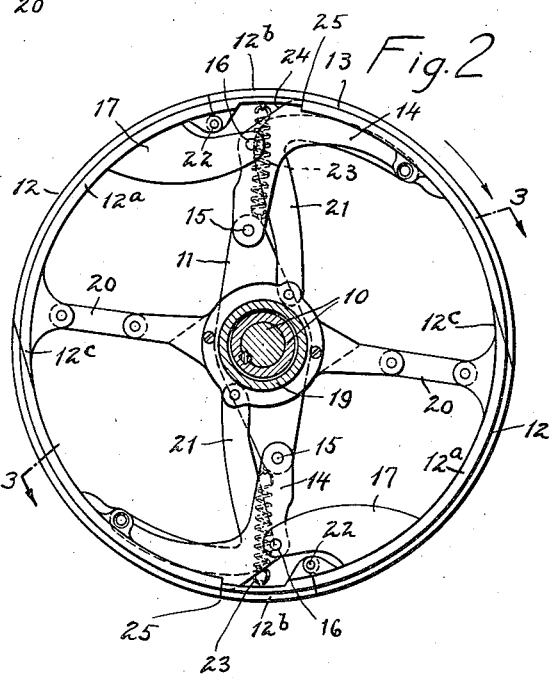
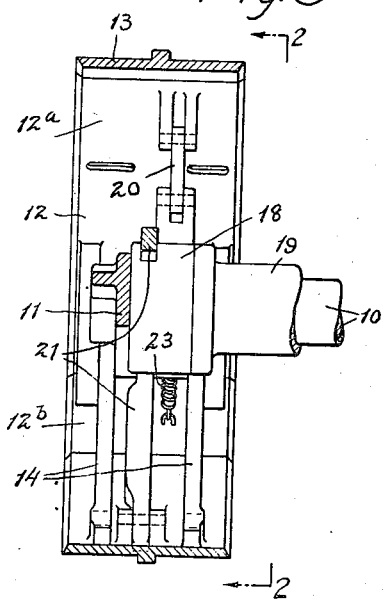
Inventor,
H. C. Bostwick,
By Robert M. Pierson
Attorney Patented May 21, 1940

2,201,468

UNITED STATES PATENT OFFICE 2,201,468

COLLAPSIBLE DRUM

Henry C. Bostwick, Coventry Township, Summit County, Ohio, assignor to The Akron Standard Mold Company, Akron, Ohio, a corporation of Ohio Application September 10, 1937, Serial No. 163,268

2 Claims. (Cl. 154—9)

This invention relates to collapsible drums and drum cores such as are used for building pneumatic tire bands. Its object is to decrease the collapsed dimensions of the drum or drum core, especially along the major axis, to facilitate the building of high-crown bands having relatively deep bead skirts.

Of the accompanying drawing, Fig. 1 is an inner end view, in section through the power shaft, showing a drum embodying my invention, in the collapsed condition.

Fig. 2 is a similar view on line 2—2 of Fig. 3 showing the drum expanded.

Fig. 3 is a transverse section approximately on the line 3—3 of Fig. 2.

The particular structure here chosen to illustrate the invention is the collapsible inner drum body or core of a tire building drum consisting of inner and outer concentric bodies having radially deep undercut bead flanges detachably fitted in the ends thereof, as disclosed in my prior application, Serial No. 132,500, filed March 23, 1937, now Patent No. 2,168,897 of August 8, 1939, and is shown without the bead flanges, but it will be understood that the invention likewise applies to tire-building forms of the more usual type comprising a single segmental drum body which may be equipped with suitable end flanges, for building tire bands directly thereon. The present invention improves upon the inner drum body of that application by obtaining a collapsed contour of less prolate form, with a smaller ratio of length of minor to major axis, requiring less deformation of beads in removing a finished tire band.

The particular feature of novelty specifically comprises articulated underlapping segments, here shown in connection with a drum of the floating-hinge type, and including pivoted heel sections which are automatically withdrawn to reduce the major diameter as the drum is collapsed, and are automatically projected into the normal drum circle as the structure is expanded.

In the drawing, 10 is the telescopic power shaft of a tire-building machine, upon which is mounted the drum having a central rotary segment support comprising a two-armed spider 11 attached to said shaft and pivotally supporting the drum segments 12 and 13, which are mounted in couples of oppositely swinging members. The base members only of the several segments are shown, without the usual overlying wing segments for widthwise adjustment and for supporting the bead flanges. The end of the segment 13 of each couple is in beveled overlapping relation to the end of the other segment 12 in the opposite couple. Each overlapping segment 13 has a radially deep pair of ears 14 constituting a hinge member pivoted at 15 on one of the arms of the spider 11, and said hinge member supports, by a floating pivot 16, the hinge member 17 of the underlapping segment.

18 is the usual control collar loosely surrounding the hub of the spider 11 and retardable for collapsing the drum by means of a brake (not shown) applied to a sleeve 19 on said collar surrounding the power shaft 10. Said collar constitutes a multiple toggle member, having a pair of long arms connecting by short links 20 with the underlapping segments 12 near the outer ends of the latter, and is connected by longer bent links 21 with the overlapping segments 13, whereby, on retardation of the collar 18, the overlapping segments 13 are first moved slightly outward, the underlapping segments 12 drawn inwardly, and the overlapping segments 13 then drawn inwardly in overlapping relation thereto to collapse the drum, as shown in Fig. 1.

In accordance with my present invention, each of the underlapping segments 12 is articulated with a body section 12ª having the hinge and link connections previously described, and a shorter heel section 12ᵇ pivoted at 22 to the body section on a center which is angularly or circumferentially offset from the pivot 16 so that 22 is carried inwardly toward the central drum axis, reducing the length of the major axis of the collapsed drum, when the body section 12ª is swung inwardly. Each heel section 12ᵇ is connected by a pull spring 23 with one arm of the spider 11, and its inner side abuts against the hinge member 14 of the adjacent overlapping segment 13. Said hinge member is outwardly shaped as a cam 24 to move the heel section 12ᵇ outwardly on its pivot 22 against the tension of spring 23 when the drum is being expanded.

The presence of the pivoted heel sections 12ᵇ on the underlapping segments permits the meeting lines 25 of the segment heels to be angularly displaced toward the toes of the overlapping segments 13 further than usual and the toes 12ᶜ of the segments 12 are correspondingly retracted in a circumferential direction with respect to the hinge structure, so that the segment toes 12ᶜ, nesting within the bends of the hinge members 14 and the links 21 in the collapsed condition, permit a correspondingly greater degree of collapse along the minor axis. The excess projection of the heels of the underlapping segments which otherwise would then occur along the major axis is reduced by flexure of the articulated segments at their hinges 22. The peripheral tape measurement of the fully contracted drum represented in Fig. 1, as compared with the expanded or normal periphery illustrated in Fig. 2, shows a contraction of substantially 28%. The ratio of collapsed minor or smallest and major or greatest axes or diameters is about 1 to 1.32, thus providing a less prolate ovoid shape and requiring less bead distortion in removal of the completed tire band than in the case of the inner drum illustrated in my aforesaid application Ser. No. 132,500, where toe members were articulated on the body members of underlapping segments.

In operation, the drum core or chuck here illustrated may be collapsed and inwardly stripped directly from a formed tire band, or stripped therefrom after removal of detachable bead rings, if any, or may be collapsed inwardly from an outer drum body, after removal of the bead rings, by applying a brake to retard the control collar 18 in the usual manner. The segments 12 and 13 then fold inwardly in succession, after a slight preliminary outward movement of the overlapping segments 13, into the relation shown in Fig. 1. The resulting angular movement of the heel ends of the overlapping segments with relation to those of the underlapping segments, withdrawing the high part of the cam surfaces 24 from under the free ends of the heel sections 12ᵇ, allows the springs 23 to turn said heel sections inwardly as will be evident, shrinking the drum body into the smallest possible compass along its major axis. This permits removal from said drum body of a tire band having relatively deeper bead skirts than has heretofore been possible. In the reverse operation, when the drum is expanded, by reversely rotating it with the brake applied, or automatically through centrifugal force, the cam surfaces 24 force the heel sections into the normal drum circle, against the tension of their springs.

It will be understood that the invention is not wholly confined to the particular type of drum here illustrated, and the form of embodiment may be varied in detail.

I claim:

1. A collapsible drum comprising an inner rotary segment-supporting spider having opposite arms, a pair of opposite segments having hinge parts pivoted on the respective spider arms, a pair of complemental underlapping segments having a pair of body sections, said body sections being formed to underlap the first-said segments, and having hinge parts carried by floating pivots on said hinge parts of the overlapping segments, and a pair of heel sections pivotally articulated on said body sections, interposed between the latter and the overlapping segments, for shortening the collapsed major diameter of the drum.

2. A drum according to claim 1 having cam members carried by segment sections abutting the heel sections, for forcing the latter into the normal drum circle as the drum is expanded, and springs for holding the heel sections against said cam members to cause retraction of said heel sections as the drum is collapsed.

HENRY C. BOSTWICK.